United States Patent Office 2,716,303
Patented Aug. 30, 1955

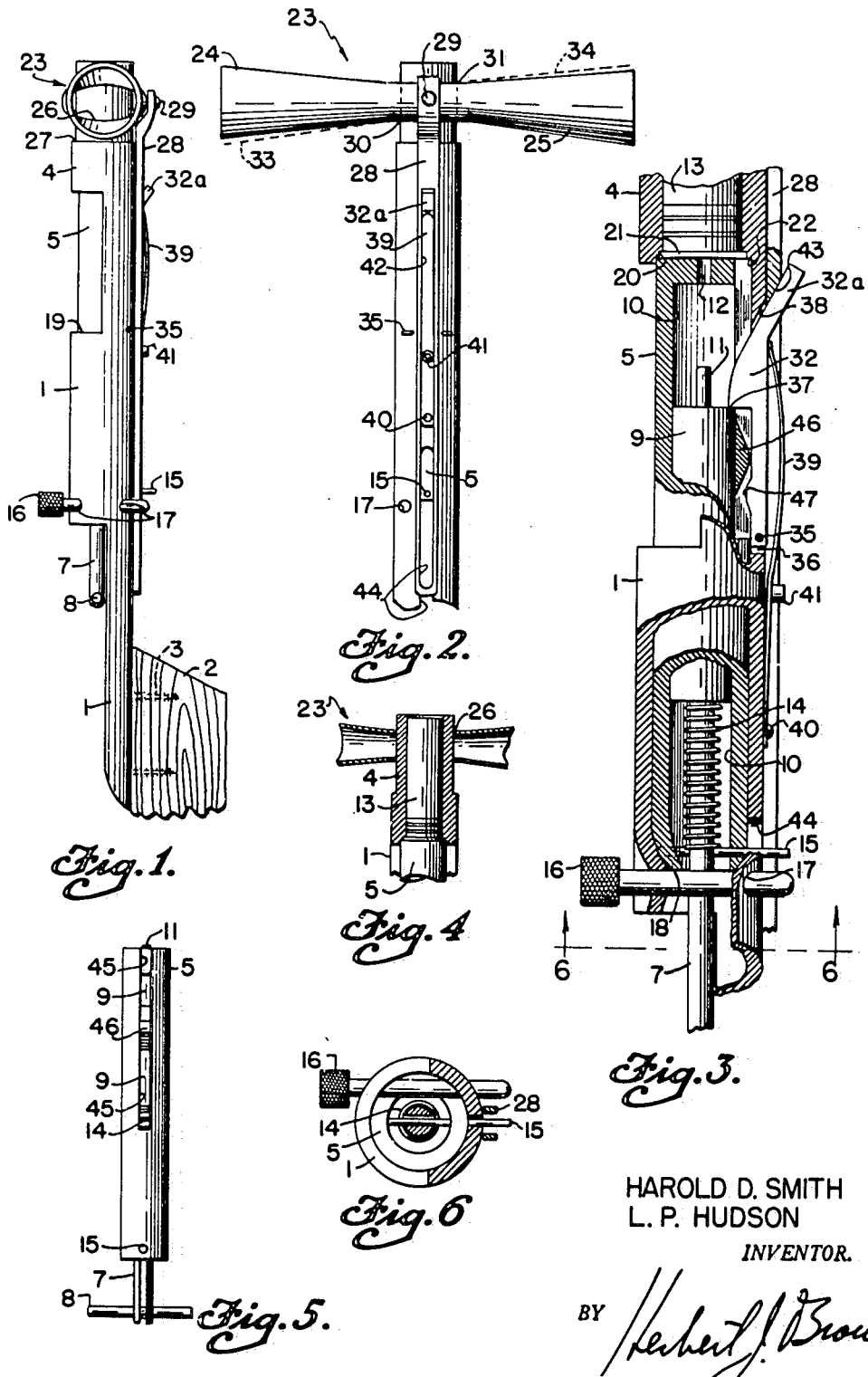

2,716,303

GUN TRAP FOR KILLING BIRDS OF PREY

Linwood P. Hudson, Fort Worth, and Harold D. Smith, Spofford, Tex.

Application August 7, 1952, Serial No. 303,082

5 Claims. (Cl. 43—84)

This invention concerns a gun trap for killing hawks and other birds of prey, and has particular reference to a trap of the type wherein there is an actuating perch positioned adjacent the muzzle of the gun barrel to induce a bird to straddle the muzzle.

An object of this invention is to provide improvements in a gun trap of the class described, whereby birds of prey, which are relatively heavy, alighting thereon will be killed instantly, while the gun trap will not operate when smaller birds alight. Another object is to provide a trap which will operate only when birds of prey alight and which has yet an unusually sensitive firing mechanism for a gun of the described class.

An additional object is to provide a gun trap which is simple and practical in construction and operation, and which is yet safe to operate.

A further object is to provide a gun trap including cam means actuating the trigger thereof directly responsive to the weight of a bird of prey on the trap, providing sure rapid discharge of the gun.

A still further object is to provide a gun trap which need not and can not be cocked until the breech of the gun barrel is securely closed as the penultimate required operation, precluding premature discharge of the gun. A related object is to provide in such a gun trap a sliding breech bolt carrying the firing pin so that the latter can contact a shell or cartridge placed in the gun barrel only when the breech is closed by the breech bolt.

Another object is to provide a gun trap constructed and arranged so that birds of prey will necessarily alight astride the gun barrel while smaller birds will not, and to utilize this difference in the provision of an operating mechanism which will respond selectively to the size of a bird of prey.

Still another object is to provide such a trap which requires no bait but will attract birds of prey by reason of its shape, and may utilize a shotgun shell for killing birds of prey at close range.

The foregoing and other objects of this invention will be apparent from a consideration of the following description and accompanying drawing of a preferred embodiment of our invention in which the various parts are identified by suitable reference characters in each of the views, and in which Figure 1 is a side elevational view of one embodiment of the gun trap of our invention, showing it cocked and emplaced on a post or the like;

Figure 2 is a rear elevational view of the embodiment shown in Figure 1, with part of the construction not shown, and showing an alternate tilted position of the perch member by means of dotted lines;

Figure 3 is an enlarged side elevational view of the embodiment shown in Figure 1, with part of the construction not shown and with part of the construction broken away and in section, and showing a shell or cartridge emplaced in the gun barrel and the gun action cocked;

Figure 4 is a front elevational view of the upper end of the same embodiment, with part of the construction broken away and in section to reveal a cartridge emplaced in the gun barrel and the breech bolt closing the breech;

Figure 5 is a front elevational view of the breech bolt removed from the embodiment of the gun trap shown; and Figure 6 is a transverse view taken on line 6—6 in Figure 3.

Referring to Figures 1 and 2 of the drawing, a generally tubular support 1, shown affixed to a post 2 as by nails or screws 3, has an integral barrel 4 at its upper end. Within the upper portion of the support 1 and slidably movable along the inner wall thereof is a generally tubular breech bolt 5 having a cocking arm 7 provided with a handle 8 projecting from the lower end of breech bolt 5.

As shown in Figure 3, the breech bolt 5 includes within it a cylindrical hammer 9 slidably movable along the inner wall 10 of the breech bolt. Secured to the upper end of the hammer 9 is a centrally positioned firing pin 11 which normally, and on firing the gun, is within and projecting through a corresponding aperture 12 located in the closed upper end of the breech bolt 5, contacting a shell or cartridge 13 positioned in the barrel 4.

The cocking arm 7 is secured to the lower end of the hammer 9, and surrounding the cocking arm is a compression spring 14. The cocking arm 7 is in the form of a split rod, as shown in Figure 5, and slidably positioned through it is a removable guide pin 15. The guide pin 15 is also removably placed in diametrically opposite sides of the breech bolt 5. One end of the compression spring 14 bears against the lower end of the hammer 9 when cocked, and the other end of the compression spring bears against the upper side of the guide pin 15. A removable locking pin 16 is inserted through opposing holes 17 in the support 1 and is set off from the axis of the support to clear the cocking arm 7. The locking pin 16 and the holes 17 are located so that the locking pin supports the breech bolt 5 at its lower end 18 when the breech bolt is positioned against the breech of the barrel 4, closing the breech. As will appear more fully hereinafter, the locking pin 16 cooperates with other parts of the construction to provide a safety mechanism, in addition to holding the breech bolt 5 against the breech.

Referring again to Figures 1 and 2, the support 1 is provided with an opening 19 on one side adjacent its upper end, which opening is large enough to permit the insertion of a shell or cartridge 13 through it and into the barrel 4 from its lower end when the breech bolt 5 is retracted or lowered from the barrel breech. As shown in Figures 3 and 4, an annular groove 20 is provided inside the breech, to accommodate and for close engagement with the rim 21 of an inserted shell or cartridge 13. Below groove 20, a second annular groove 22 is provided inside the breech to accommodate and for close engagement with the upper end of the breech bolt 5, which is greater in diameter than the shell or cartridge rim, to close the breech.

Mounted on the barrel 4 adjacent its upper end is a perch member 23 having projections 24 and 25, preferably of about the same size, which extend laterally from the barrel 4 in opposite directions. The perch member is relatively short and of relatively small cross sectional area, so that a bird of prey will alight astride the barrel 4, gripping one projection with each foot. As shown, the perch member may be a tube which is flattened in an area midway between its ends and which has opposing circular holes 26 centrally located in each of the flat portions, for receiving the upper end of the barrel 4. As shown particularly in Figure 4, these holes 26 are slightly larger in diameter than the outside diameter of the barrel adjacent its upper end. The outer surface of the barrel at this end is relatively smooth to permit the perch member to move readily along it. The barrel 4 is enlarged in the area adjacent its breech, and a shoulder 27 is provided intermediate the ends of the barrel to prevent further downward movement of the perch. A vertically movable trigger actuating member 28 is pivotally connected by a pivot pin 29 to a narrow side of the perch member 23 midway between its ends, supporting the perch member as will appear more fully hereinafter. The trigger actuating member 28 is also spaced from the perch member 23, as shown in Figure 1, to permit the latter to tilt in either direction until it contacts the barrel 4 at diagonally opposite edges of the holes 26 in the perch member, one pair of these edges being indicated in Figure 2 by numerals 30 and 31.

The foregoing construction has for an important object the provision of a perch member which will descend surely and rapidly when a bird of prey alights, actuating a trigger 32 through downward movement of the trigger actuating member 28, yet will not descend appreciably in response to the moderate downward pressure resulting when a smaller bird alights. The latter purpose is accomplished in the preferred construction shown and set forth above in this manner: a small bird by reason of its size alights on either of the lateral projections 24 or 25, tilting the perch member 23 to a position where diagonally opposite sides of the lateral projections are positioned respectively as shown by broken lines 33 and 34, thereby causing the perch member to bear on the barrel at the edges 30 and 31 of perch member holes 26. Particularly when our preferred construction including relatively narrow central side sections of the perch member 23 is used, the perch member binds on the barrel preventing descent of the perch member and actuation of the trigger.

Referring to Figures 1, 2, and 3, pivotally mounted on the support 1 as by a hinge pin 35, within an upper longitudinal slot 36 therein, and opposed to the opening 19 in the support, is the trigger 32. The trigger includes an integral sear 37 arranged to engage the hammer 9 for cocking the gun. The trigger has an outwardly projecting arm 32a which is inclined from the vertical at an upper side 38 thereof. A leaf spring 39 is fastened to the support 1 as by a rivet 40 and by an adjusting screw 41 for adjusting the spring pressure, and bears on the outer surface of the trigger 32.

The trigger actuating member 28 is in the form of a bar bent at its upper end and having a slot 42 extending longitudinally from adjacent its lower end to a point in its upper half where it ends at a beveled transverse surface 43 centrally of the width of the actuating member 28. It is an important feature of our invention that the actuating member 28 is directly connected to the perch member 23 and moves downwardly equally with the perch member, and the movement of the actuating member is translated directly into transverse movement of the sear 37 by the cam action of the trigger actuating member at its beveled surface 43 on the trigger arm at its upper side 38. Thus, the sear 37 may be arranged to engage the hammer 9 for a very small transverse distance, so that when a bird alights and contacts both projections 24 and 25 of the perch 23, slight resulting downward movement of the beveled surface 43 results immediately in the slight transverse movement of the sear 37 required, whereupon the sear is entirely clear of the hammer, releasing it for firing.

The trigger actuating member 28 is pivotally connected by the pivot pin 29 to the perch member 23, as described above. This connection supports the perch member, which is preferably light in weight, and constitutes the sole support for the perch member when said perch member extends perpendicularly to the barrel 4. The actuating member 28 is in turn supported at its beveled surface 43 by the trigger 32 at its upper side 38, the tension of the leaf spring 39 being suitably adjusted to regulate the pressure from the actuating member 28 necessary to actuate the trigger. The actuating member 28 is bent or curved at its upper end to correspond to the perch member 23. The actuating member slot 42 accommodates spacedly within it the trigger projection, the leaf spring 39, and the guide pin 15. In the support 1 and registering with the actuating member slot 42 is an additional, lower longitudinal slot 44, which accommodates the guide pin 15 in vertical movement. The sides of the lower support slot guide the guide pin 15, and the lower end of that slot prevents further downward movement of the guide pin.

Referring particularly to Figures 3 and 5, the breech bolt 5 has in its upper portion a longitudinal slot 45 parallel with its axis and providing access to the firing means within, which slot registers with the upper support slot 36 when the breech bolt is positioned in the support 1 and closes the breech. The uppermost section of the breech bolt slot 45 accommodates the sear 37 when the breech bolt is moved. The adjacent section of the slot 45 permits the sear 37 to engage the hammer 9 for cocking, when the latter is retracted. A ridge 46 integral with the body of the breech bolt 5 is next provided in the slot 45, and it is sloped at both ends for coaction with a ridge 47 provided on the inner surface of the trigger 32. The trigger ridge 47 is below the sear 37 and sloped at both ends so that when the breech bolt is moved up or down, the trigger ridge 47 and the breech bolt ridge 46 act to move the trigger 32 and the integral sear 37 outwardly.

In operation, the gun trap is affixed to a post or the like where it will attract birds of prey. The locking pin 16 is removed and the breech bolt 5 is lowered or retracted. A shell or cartridge is then inserted through the opening 19 in the support 1 and seated in the barrel 4. At this time, the gun action can not be cocked since the ridge 46 on the hammer 9 moves the trigger sear 37 outwardly. The guide pin 15, resting at the bottom of slot 44, not shown, will support the breech bolt 5 while the hammer 9 is being retracted, and the firing pin 11 is then out of firing position, that is, remote from the shell or cartridge 13. The only remaining support for the bolt 5 is the locking pin 16, which can only be inserted after the next and penultimate required operation, the raising of the breech bolt 5 until it engages the barrel breech followed by insertion of the locking pin 16, sealing the breech over the shell or cartridge. Thus, there is provided a safety mechanism to eliminate premature discharge of the gun. In the last required operation, the cocking arm 7 is pulled down by its handle 8 until the hammer 9 engages with the sear 37, which is being urged inwardly by the leaf spring 39.

As previously described, when a small bird alights on either of the perch member projections 24 or 25, the gun does not fire. When a bird of prey alights, straddling the muzzle of the gun barrel and resting one foot on each perch member projection, the gun discharges, killing the bird instantly. The locking pin 16 is then removed, the breech bolt 5 is lowered, the spent shell or cartridge is removed, and the above operations are repeated.

Modifications in the construction and arrangement of the preferred embodiment of our invention shown and described herein which are within the scope of our invention will occur to those skilled in the art, and to the extent that such modifications are within the scope of the appended claims, it is to be understood that they constitute part of our invention.

What is claimed is:

1. In a gun trap, an upwardly directed gun barrel adapted to receive a shell or cartridge in its lower end, a support for said barrel, a firing mechanism in engagement with said support and arranged for firing said shell or cartridge, a vertically movable member positioned adjacent said barrel and connected with said firing mechanism, a relatively short transverse perch member including a hole therethrough having a transverse dimension slightly greater than the outside diameter of said barrel, the muzzle end of said barrel being positioned within the perimeter of said hole, and means pivotally supporting said perch member on said vertically movable member, said means constituting the sole support for said perch member when said perch member extends perpendicularly to said barrel.

2. A gun trap as defined in claim 1 wherein said firing mechanism includes a movable breech bolt arranged to close the breech of said barrel, a firing pin projecting from the end of said bolt adjacent said barrel, and means disengagably securing said bolt against said breech.

3. In a gun trap as defined in claim 1, a trigger included in said firing mechanism and projecting outwardly from said support, and cam means connected to said vertically movable member and arranged for engaging said trigger.

4. In a gun trap as defined in claim 1, a trigger included in said firing mechanism and pivotally mounted on and projecting outwardly from said support, a cam surface on said vertically movable member, said trigger movably supporting said vertically movable member at said cam surface, a breech bolt included in said firing mechanism and slidably engaging said support and also arranged at its upper end to close the breech of said barrel, firing means housed within said bolt and including a firing pin which projects through said upper end of said bolt, said trigger being adapted for cocking engagement with said firing means, a cocking arm connected to said firing means, and means disengagably securing said bolt against said breech.

5. In a gun trap, an upwardly directed gun barrel adapted to receive a shell or cartridge in its lower end, a support for said barrel, a firing mechanism in engagement with said support and arranged for firing said shell or cartridge and including a trigger projecting outwardly from said support, a vertically movable member positioned adjacent said barrel and movably supported by said trigger, a relatively short perch member including lateral projections extending in opposite directions from said barrel and being positioned movably around and in close spaced relation to said barrel adjacent its muzzle end, and means pivotally supporting said perch member on said vertically movable member, said means constituting the sole support for said perch member when said lateral projections extend perpendicularly to said barrel.

References Cited in the file of this patent

UNITED STATES PATENTS

| 237,942 | Woolsey | Feb. 15, 1881 |
| 690,244 | DeRoshey | Dec. 31, 1901 |
| 967,026 | Lindsey | Aug. 9, 1910 |
| 2,249,332 | Smith | July 15, 1941 |

FOREIGN PATENTS

| 61,383 | Germany | Apr. 8, 1892 |